Patented Sept. 30, 1924.

1,510,131

UNITED STATES PATENT OFFICE.

ARTHUR A. BACKHAUS, OF BALTIMORE, MARYLAND, ASSIGNOR TO U. S. INDUSTRIAL ALCOHOL CO., A CORPORATION OF WEST VIRGINIA.

PROCESS OF MAKING DECOLORIZING CARBONS.

No Drawing. Application filed May 7, 1919, Serial No. 295,470. Renewed August 20, 1924.

*To all whom it may concern:*

Be it known that I, ARTHUR A. BACKHAUS, a citizen of the United States, residing at Baltimore, in the State of Maryland, have invented a certain new and useful Improvement in Processes of Making Decolorizing Carbons, of which the following is a specification.

My invention relates particularly to a process of producing carbons for decolorizing from the residues left in alcohol distillation and product thereof.

The object of my invention is to provide a process by means of which decolorizing carbons may be obtained from distillery waste of various kinds as well as the product thereof, so that carbons of an advantageous character are obtained which may be used for decolorizing materials of many different kinds. The object of my invention is furthermore to obtain decolorizing carbons which are more efficient than other carbons used for decolorizing, as for example, bone black, as the same decolorizing effect can be obtained with a smaller quantity of the carbon, and as the carbons made in accordance with my invention are more porous. Further objects of my invention will appear from the detailed description contained hereinafter.

While my invention is capable of embodiment in many different forms, for the purpose of illustration I shall describe only one form of my invention hereinafter in detail. Furthermore, while my invention is capable of being applied to the production of decolorizing carbons from distillery wastes of various kinds and from the distillation of any material used in the production of alcohol, such for example as molasses, grains of various kinds, potatoes, etc., I shall describe my invention particularly as applied to the waste from the distillation of molasses fermentation.

As one example of my invention I may proceed as follows:

A quantity of distillery waste or slop from the distillation of fermented molasses, after the alcohol has been substantially entirely removed, is evaporated down to the density of 25° to 33° Bé. The evaporated slop is then dried in any suitable manner, as for example, upon the external surface of a drum drier heated on the interior by steam, or in any other suitable manner. Instead, if desired, to the concentrated slop and without drying the same before charging into the retort, there may be added an absorptive material to prevent foaming in the retort, as for example, two pounds of lime or four pounds of broken nut shells, or five pounds of infusorial earth, to five pounds of the concentrated slop. The material thus obtained is then charged into a retort heated to a temperature of approximately 750° C. where the heat decomposes the organic matter so as to produce carbon and volatile materials of various kinds including oils. Live steam is introduced into the slop which is being treated towards the end of the heating operation in order to entirely remove the volatile materials. Thereafter the carbon is removed from the retort and leached with warm water to recover the soluble salts such for example as potassium chloride, potassium sulphate and potassium carbonate. The carbon is then washed with a small quantity of dilute hydrochloric or sulphuric acid in order to remove traces of carbonates. The carbon is now dried by the application of heat. In order to reduce the carbon to particles of the desired size it may be ground immediately after its removal from the retort, or after the drying of the carbon following the treatment with the dilute acid, so as to obtain granules, all of which will pass through a sieve four meshes to the inch. The comminuted dried carbon is then screened so as to obtain the different grades having different degrees of fineness and so as to be applicable to the various industrial arts. The coarser grades are suitable especially for operations involving percolation in the decolorizing of materials passing through the same and the finer grades are used in filter presses by mixing them with the materials to be decolorized and then passing the mixture through a filter press.

The decolorizing carbon thus obtained is much more effective in the decolorizing of materials of various kinds, as for example, petroleum oils, dyestuffs, cottonseed oils, sugar solutions, etc., than previous decolorizing carbons, as for example, bone black, inasmuch as the same decolorizing effect can be obtained by the use of a smaller quantity of the carbon made in accordance with my invention. This is important as some decolorizing operations require a large quantity of the decolorizing carbon, and it is this which largely determines the market price of the decolorized product. Furthermore, the carbon made in accordance with my invention is more porous than other decolorizing carbons, as for example, bone black, and the materials to be decolorized can therefore be passed through the carbon much more readily and effectively.

While I have described my invention above in detail I wish it to be understood that many changes may be made therein without departing from the spirit of the same.

I claim:

1. The method of obtaining a decolorizing carbon which consists in evaporating molasses distillery waste to about 25° to 30° Bé, adding thereto an absorptive material in sufficient quantity to prevent foaming in the retort, heating in the retort to about 750° C., and introducing steam before and near the end of the operation to remove volatile materials.

2. The method of obtaining a decolorizing carbon which consists in evaporating molasses distillery waste to about 25-30° Bé, adding thereto an absorptive material in sufficient quantity to prevent foaming in the retort, heating in the retort to about 750° C., treating the resultant charred product with live steam to remove volatile materials, leaching in warm water to recover salts, washing with dilute acid and then drying, grinding and screening the resultant particles.

3. The method of obtaining a decolorizing carbon which consists in evaporating distillery waste and partially desiccating it, heating in the retort to about 750° C., and introducing steam before and near the end of the operation to remove volatile materials.

In testimony that I claim the foregoing, I have hereunto set my hand this 11 day of April, 1919.

ARTHUR A. BACKHAUS.